I. C. MAYO.
Culinary Boilers.

No. 156,708. Patented Nov. 10, 1874.

Witnesses:
S. N. Piper
L. N. Höller

Israel C. Mayo
by his attorney
N. H. Eddy

UNITED STATES PATENT OFFICE.

ISRAEL C. MAYO, OF GLOUCESTER, MASSACHUSETTS.

IMPROVEMENT IN CULINARY BOILERS.

Specification forming part of Letters Patent No. 156,708, dated November 10, 1874; application filed April 22, 1874.

*To all whom it may concern:*

Be it known that I, ISRAEL C. MAYO, of Gloucester, of the county of Essex and State of Massachusetts, have invented a new and useful Improvement in Culinary Boilers; and do hereby declare the same to be fully described in the following specification and represented in the accompanying drawings, of which—

Figure 1:
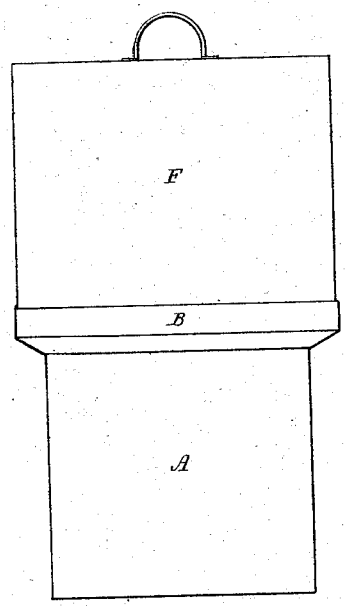
Figure 2:
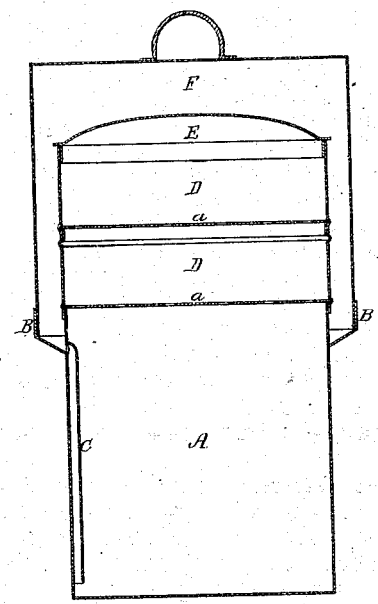
Figure 3:
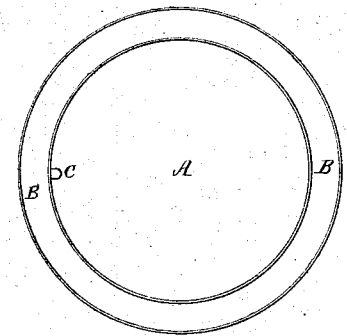

Figure 1 denotes a front elevation, and Fig. 2 a vertical and transverse section, of a culinary boiler or cooking apparatus embodying my invention. Fig. 3 is a top view of the boiler or water-holding vessel of the apparatus.

My invention relates to an apparatus for boiling and steaming meats or vegetables; and consists in the combination and arrangement of a condenser, as hereinafter described, with one or more steaming pans or vessels, and a pot or boiler provided not only with a trough to surround it at its upper part or mouth, but with a tube or conduit leading down from such trough into and opening into the pot or boiler.

In such drawings, A denotes a cylindrical or other proper-shaped pot, kettle, or boiler, surrounded at its upper end by a trough, B, and having leading down from and opening out of such trough a tube or conduit, C, which, arranged against the inner surface of the top or vessel A, opens near its bottom. Over and upon the vessel A I arrange one or more steaming pans or chambers, D, each being provided with a perforated or foraminous bottom, $a$. The said vessel or vessels D is furnished with a cover, E, perforated with holes. This cover, however, is not an essential feature in the apparatus. The vessel or vessels D are surrounded by an inverted cover, F, open at bottom, closed at top, and fitting into the trough B, all being as represented. This cover F is a condenser, its purpose being to collect and condense the steam that may escape from the vessel or vessels D, and convey it, in the state of water, into the trough B, from whence it will flow back into the vessel A through the conduit C. In case the vessel or vessels D are off the pot A, and water may be in ebullition in the latter and boil over its upper edge, the overflow will be received into the trough, and, by the pipe C, will be returned to the pot.

This apparatus is specially useful for making soup, and in boiling and steaming meats or vegetables. It is also useful for conducting various other operations, especially in cooking.

While meat may be boiled in the pot, vegetables in the compartments or vessels D may be cooked by steam arising from the liquid in the pot.

The escaping steam and oleaginous vapors will be condensed in the condenser, and by it be conveyed into the trough, and from thence will flow through the tube C back into the pot, whereby there will be little or no waste of water or the products boiled from the meat or matters in the pot.

The pot may be used without the vessel or vessels D, and with or without the condenser F, or with a cover or condenser of less depth.

I do not claim a culinary apparatus as represented in the United States Patent No. 76,231. Although I use a series of steaming-vessels with a pot or boiler provided with a trough at top and a tube or conduit to lead from such trough into the pot, I do not use such a trough and pipe to either steaming-vessel, but, instead thereof, I perforate the cover E of the upper vessel D, and make use of a condenser, F, to surround the vessels D and fit to the trough B, all as shown, thereby saving the cost and necessity of a trough and pipe to each steaming-vessel, and, besides, covering them, so as to insulate them from the external atmosphere in a manner to prevent, to a great extent, condensation of steam within them. Nor do I claim a culinary vessel having a boiler, a diaphragm, a series of steaming-vessels, a cover, and a perforated conical dome within the cover, all being as shown in the United States Patent No. 78,587.

In my culinary apparatus the condenser F, instead of fitting into the boiler, fits to the trough B, which encompasses the boiler A, and has the conduit C to lead down within such boiler, as shown, such trough operating not only to support the apparatus in a stove or range, but effectually to intercept and return to the boiler any water that may boil over.

Thus it will be seen that my culinary apparatus has important advantages.

I therefore claim—

The trough B and educt C, combined, constructed, and arranged, essentially as explained, with the boiler A, condenser F, and one or more steaming-vessels, D, having a perforated convex cover, E, all being to operate as specified.

ISRAEL C. MAYO.

Witnesses:
   R. H. EDDY,
   J. R. SNOW.